United States Patent [19]

Martineau

[11] 4,174,245
[45] Nov. 13, 1979

[54] METHOD OF FABRICATING A FLEXIBLE FUEL TANK

[75] Inventor: Philippe M. Martineau, Nantes, France

[73] Assignee: Regie Nationale des Usines Renault, Billancourt, France

[21] Appl. No.: 881,125

[22] Filed: Feb. 24, 1978

[30] Foreign Application Priority Data

Feb. 24, 1977 [FR] France .................. 77 05423

[51] Int. Cl.² .............................................. B32B 1/02
[52] U.S. Cl. .................................... 156/245; 156/282;
156/289; 220/88 R; 220/453; 264/328; 264/250
[58] Field of Search ................ 156/80, 242, 245, 282,
156/289, 304; 264/248, 250, 255, 260, 264, 266,
297, 328; 220/88 R, 89 B, 453, 465, 470, DIG.
12, DIG. 29

[56] References Cited

U.S. PATENT DOCUMENTS

| 3,472,715 | 10/1969 | Weinbrenner et al. | 156/245 |
| 3,779,420 | 12/1973 | Kraus | 220/453 |
| 3,782,588 | 1/1974 | Allen | 156/242 |
| 3,832,437 | 8/1974 | Taylor | 264/250 |

FOREIGN PATENT DOCUMENTS 2501291 7/1976 Fed. Rep. of Germany .
2114604 12/1972 France .

*Primary Examiner*—Caleb Weston
*Attorney, Agent, or Firm*—Oblon, Fisher, Spivak, McClelland & Maier

[57] ABSTRACT

A method of fabricating a flexible fuel tank by firstly injecting an elastomer into a mold formed in the shape of a half-shell with a peripheral edge, cooling the peripheral edge of the injected elastomer, vulcanizing in-situ the entire half-shell except for the cooled peripheral edge, increasing the mold volume, halting the cooling of the peripheral edge, secondly injecting additional elastomer into the mold, and vulcanizing in situ the secondly injected elastomer, in addition to the peripheral edge of the firstly injected elastomer, such that the peripheral edges of the firstly and secondly injected elastomer half-shells unite, and the safety tank is formed of the thusly united half-shells.

11 Claims, 27 Drawing Figures

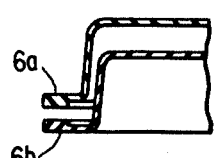
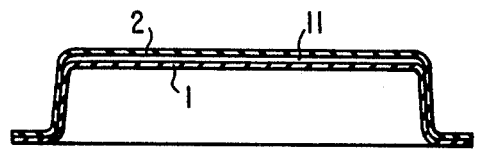
FIG.6    FIG.7
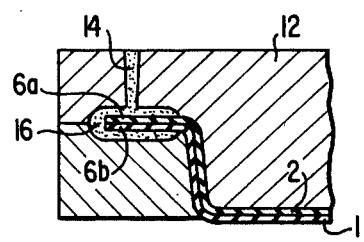
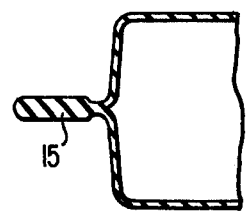
FIG.8    FIG.9
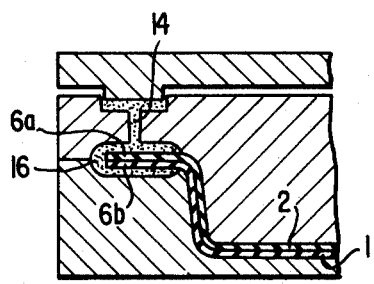
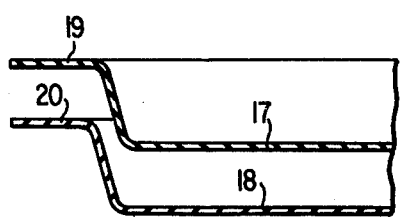
FIG.10    FIG.11
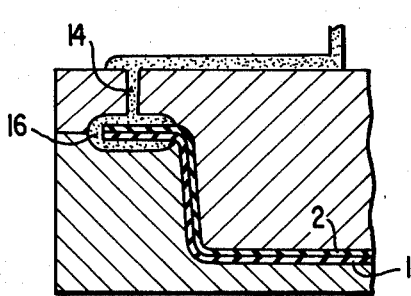
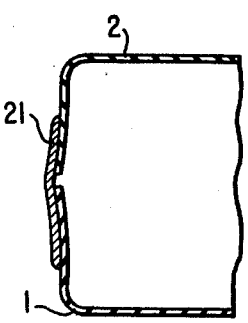
FIG.12    FIG.13
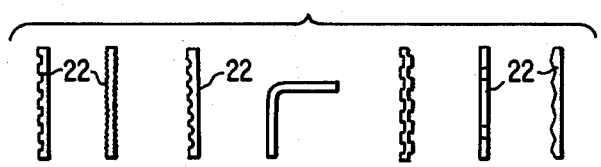
FIG.14

4,174,245

METHOD OF FABRICATING A FLEXIBLE FUEL TANK

BACKGROUND OF THE INVENTION

1. Field of the Invention

The present invention relates to various methods of fabricating a flexible fuel tank constituted by two sheets of elastomers fused together at their periphery, devoid of any reinforcing fabric.

2. Description of the Prior Art

The advantages to be derived from the use of flexible fuel tanks are presently known, particularly their excellent resistance to shock and rupture because of their considerable possibilities for deformation and stretching.

However, the fabrication of flexible fuel tanks from halves molded, trimmed and assembled by direct vulcanization of their periphery implies a certain number of manipulations of the molded blanks and poses problems with respect to the positioning of the various connecting elements, such as the different input and output fuel lines, venting arrangements, etc.

In addition, the resistance at the point of attachment of the different connecting parts is sometimes deficient.

SUMMARY OF THE INVENTION

Accordingly, an object of this invention is to provide a novel method of fabrication which palliates the above drawbacks and relies essentially on injection-molding techniques, by compression or by transfer, which present numerous possibilities as to the shape, homogenity and the rapidity of obtaining the envelope.

According to the process of the invention the molded half-shells are provided with nipples for connection to various attached elements molded directly in them, the half-shells thus obtained being subsequently cemented together, joined by local vulcanization, and followd by a supplemental vulcanization of the regions to be united or molded together.

In the case of cementing, the adhesives or solvents may be utilized directly on the vulcanized, semi-vulcanized or raw rubber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5 to 7 are illustrations of a variation of the method of FIGS. 3 and 4, FIGS. 8 to 10 are illustrations of a second variation, FIGS. 11 to 13 are illustrations of a third variation, FIG. 14 is a view of different forms of an attached element utilized at connection points.

DESCRIPTION OF THE PREFERRED EMBODIMENTS

Figure 1:
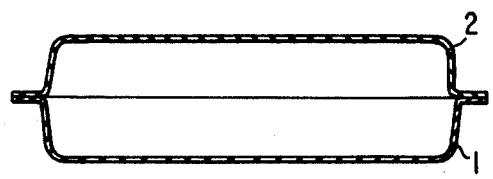
FIGS. 1 and 2 are views of a flexible tank in the filled and empty states.
Figure 2:
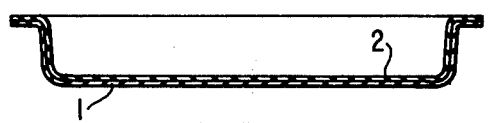

Referring now to the drawings, wherein like reference numerals designate identical or corresponding parts throughout the several views, and more particularly to FIGS. 1 and 2 thereof, the tank realized in accordance with the invention, essentially consists of two half-shells, an upper 2 and a lower one 1, obtained by injection molding, simultaneously or independently, preferably in the same press.

As is shown in FIG. 2, the volume of the empty tank is zero; the flexible half-shells 1 and 2, then, are shaped to this end in appropriately formed molds.

Figure 3:
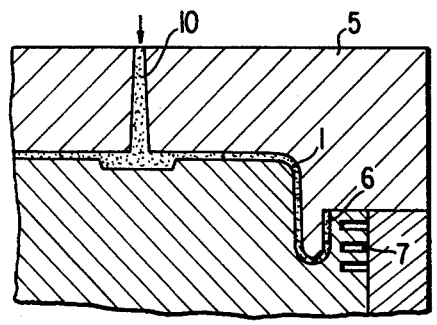
FIGS. 3 and 4 are schematic representations of a first embodiment of the method of the invention.
Figure 4A:
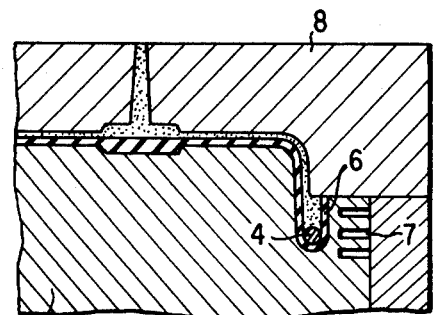

A first type of usable mold is illustrated in FIGS. 3 and 4.

The core 3 and the stamp 5 define a molding cavity permitting the half-shell 1 to be obtained by injection of the elastomer through the passage 10 made for this purpose in the stamp 5.

There is provided the turned up periphery 6 of this half-shell in the immediate vicinity of channels 7 in the core 3, intended for the regulated circulation of a cooling or heating liquid.

This arrangement permits under-vulcanizing in the periphery 6 of the half-shell 1 when the temperature of the corresponding zone of the mold is locally lowered by circulation of refrigerant liquid through the channels 7, while the rest of the half-shell 1 is completely vulcanized because of the higher temperature of the rest of the mold.

The stamp 5 is then withdrawn and a vulcanized rubber cord 4 is positioned in the peripheral depression 6. This cord acts as a barrier between the zone previously under-vulcanized and the completely vulcanized part and thus avoids certain irregularities between the joined and free portions at the time of fusing the half-shells 1 and 2 together.

Following this operation a new stamp 8 (FIG. 4) is positioned in the press, the cavity of which permits the injection of the half-shell 2 directly over the half-shell 1. The refrigerated zone 6 is brought back to the temperature of the rest of the mold, thus allowing the union and curing of the juncture plane of the envelope at the location of the under-vulcanized portion of the half-shell 1. Since the half shell 1 was fully vulcanized, except for that in zone 6, the half shells will not become bonded during the vulcanization of the half shell 2 except adjacent zone 6.

Figure 4B:
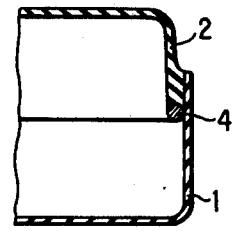

FIG. 4b shows the resultant product when filled with fuel.

Figure 5:
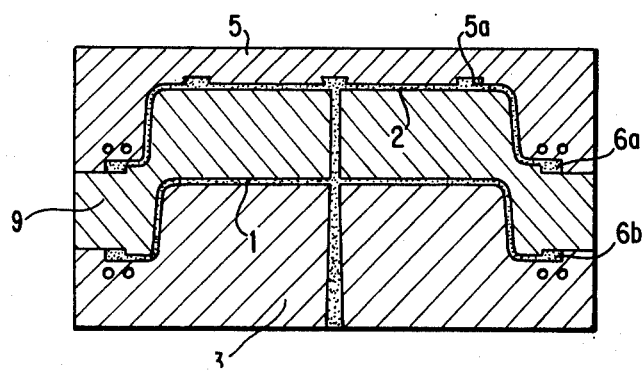

FIG. 5 represents a different arrangement of the forming device which permits simultaneous injection of the half-shells 1 and 2 in the same press without having to change the stamp 5. According to this first variation, an intermediate piece 9 is placed between the shaping pieces 5 and 3 of the mold, the pieces 3, 5 and 9 determining the molding cavities for the half-shells 1 and 2.

The principle of under-vulcanized peripheral zones 6a and 6b in the latter embodiment again utilized in the embodiment of FIG. 5.

After injection of the said half-shells 1 and 2 (FIG. 5) the intermediate portion 9 of the mold is removed. The upper half-shell 2 remains attached by a system of clips or buttons 5a judiciously distributed over the inner surface of the stamp 5. One or both of the half-shells exhibit an extra-thick region in their periphery in the under-vulcanized zone as shown in detail in FIG. 6.

By a second descending movement of the press, the half-shells 1 and 2 are positioned one on top of the other and their union effected by the compression and heating of the under-vulcanized rubber in the zones 6a and 6b.

To eliminate the possiblity of the inner contacting surfaces of the half-shells sticking together, a space 11 can be maintained between them by the injection of air (FIG. 7). The thickness of this cushion of air 11 is kept small so as to conserve a zero volume in the empty tank. This space is obtained by varying the thickness of the intermediate core 9.

It is to be noted that the under-vulcanized rubber holds well and handling of the half-shells is possible when certain elementary precautions are taken.

Another means of joining the peripheral zones of the half-shells is illustated in FIG. 8. The latter are now disposed in a new cavity determined by the mold elements 12 and 13 which have in the region of the future tank's border a free volume 16 intended to receive additional elastomer, injected by way of the opening 14 made in the upper mold 12. The final result is seen in FIG. 9 where the flange 15 is produced by the homogenization of the peripheral zones 6a-6b of the half-shells with one another and by the addition of the elastomer injected into the free volume 16.

The injection press may be replaced by a joining vise disposed to act on the plane of juncture in the manner of compression or transfer molding, as illustrated in FIG. 10.

Another embodiment for the fabrication of this type of flexible tank is shown in FIGS. 11–13. In the method embodied therein the half-shells 17–18 of FIG. 11, likewise provided with flanges 19–20, are injected and completely vulcanized in a first operation.

The upper surface of flange 19 and the lower surface of flange 20 are cleaned, buffed and glued and the assembly made up of the two joined half-shells is placed in the mold of FIG. 12. This, like those of FIGS. 8 and 10, has a molding cavity 16 receiving an additional quantity of elastomer through the passage 14, intended to form a rubber layer 21 straddling the flanges and joining the two half-shells together, in the case of full tank, as represented in FIG. 13.

An improvement of the above method involves the application of glues or solvents with exceptional holding power to join the hydrocarbons, but this method entails a rigid support. In this case there is interposed between the surfaces to be joined an intermediate layer, called a hoop, of metal or plastic such as a polyamide, polyurethane, polyester, etc. Such intermediate hoops 22 are represented in cross-section in FIG. 14. They may be solid or pierced with holes, have one or both sides smooth, corrugated, dimpled, be parallel or make a definite angle. The surface of the intermediate hoop 22 is given a grainy finish and glue is applied to one side thereof.

Figure 15:
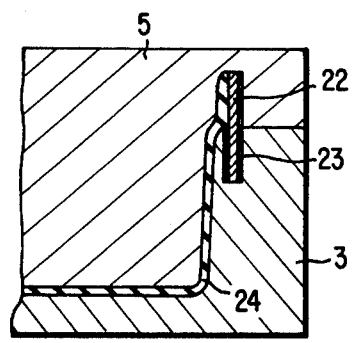
FIGS. 15–20 are illustrations of a method for fabricating the element of FIG. 14, and FIGS. 21 to 25 are views of different types of connections obtained with attached elements.

FIG. 15 indicates the positioning of the hoop 22 in a slot 23 provided for this purpose in the lower element 3 of the mold. Opposite this slot 23 the upper element 5 of the mold has a recess into which the hoop 22 extends and which admits a certain volume of elastomer which is to be bonded under heat to the dimples or grooves on the glued side of hoop 22.

The hoop 22 may likewise be positioned horizontally or obliquely in the mold and possibly be held in place by clipping or hooking on projections provided in the mold for this purpose.

Figure 16:
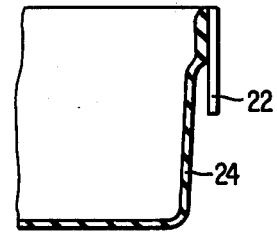

The elastomer is then injected into the assembly repressented in FIG. 15, giving rise to the half-shell 24 illustrated in FIG. 16. The half-shell 24, after vulcanization, is subjected to a buffing operation in order to remove any trace of rubber left on the hoop from the first injection. It is noted that this side, not having been previously coated with glue, presents fewer difficulties during the buffing operation.

Figure 17:
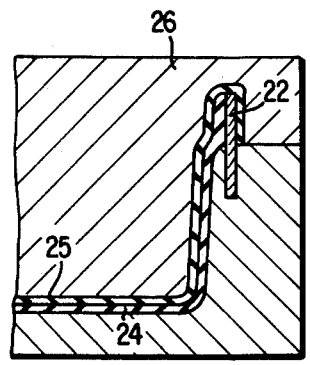

The free side of the hoop 22, thus prepared, is next coated with glue and the half-shell 24 is then positioned on an injection press having another upper mold element 26 permitting the realization of the second half-shell 25 (FIG. 17), joined in the first by being cemented to the free side of the hoop 22. This metal or plastic hoop 22 is very resilient, supports deformations well, and can thus be utilized without detriment to the qualities of the tank.

Figure 18:
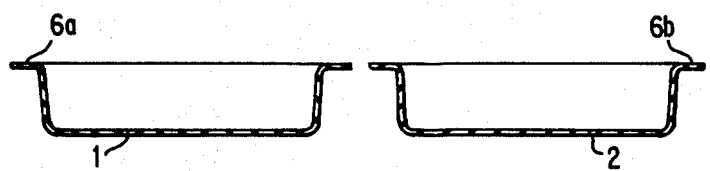
Figure 19:
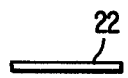
Figure 20:
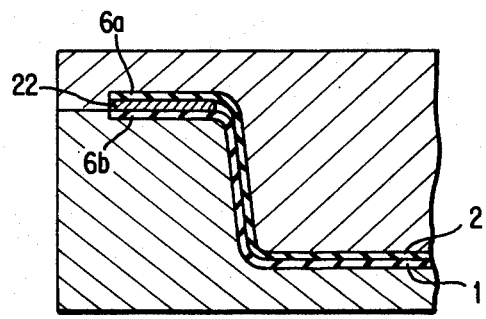

FIGS. 18 to 20 relate to a composite method of fabricating the flexible, tank, calling upon the combined characteristics of the preceding methods.

A first molding results in the half-shells 1 and 2 the flanges of which, 6a and 6b respectively, are under-vulcanized. They are then placed in a press (FIG. 20), after a hoop 22, coated with cement on both sides, has been disposed between the under-vulcanized flanges 6a and 6b. The assembly is then compressed and heated so that it becomes united by complete vulcanization of the elastomer.

Figure 21:
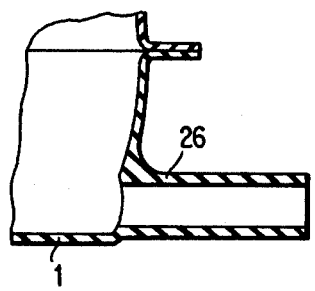

The following figures illustrate the specific possibilities which are offered by this method of injection molding flexible tanks, and more particularly relative to the joining of different attached elements to the envelope itself. It is thus seen how the fuel line 27 of the carburetor is joined to the flexible tank by the intermediary of a nipple 26 molded into the half-shell 1 and formed consequently perfectly integral with the half-shell 1. (FIG. 21).

Figure 22A:
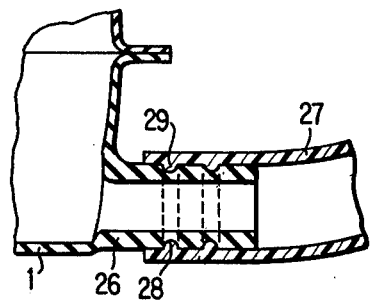
Figure 22B:
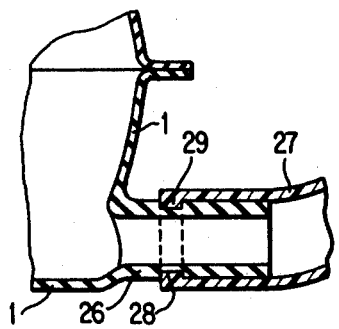

The attachment of the line 27 of the nipple 26 can be effected in many ways. For instance, in FIGS. 22A and 22B, a system of notches constituting one or more peripheral grooves or channels 28 are formed during molding on the nipple 26. The grooves or channels 28 are associated with one or more channels or grooves 29 in the interior of the line 27, the contacting portions of the elements 26–27 are joined and combined by the use of adhesives. The elements 26–27 are then forcibly assembled and placed in an autoclave to cure the adhesive.

Figure 23:
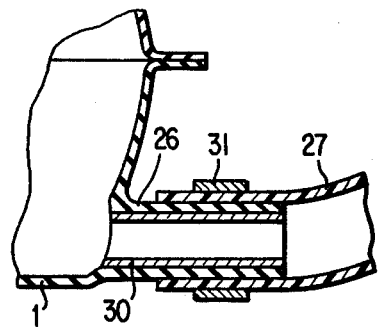

In the mounting of FIG. 23 a metal or plastic insert tube 30 is provided during molding of the half-shell. The tube 3 holds rigid the nipple 26 injected all around this insert tube and permits attachment of the line 27 by clamping the attached elements 26 and 27 with a collar 31, which may or may not be combined with cold cementing.

Figure 24:
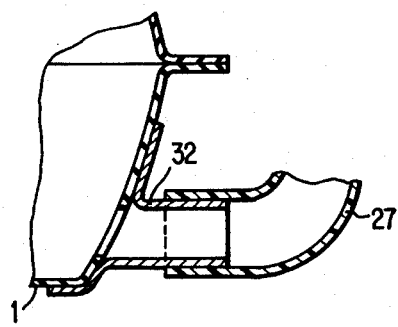

FIG. 24 represents another solution to assembling the line 27 to the tank using an intermediate piece 32 attached to the half-shell 1 by being molded cemented or vulcanized thereon.

Figure 25:
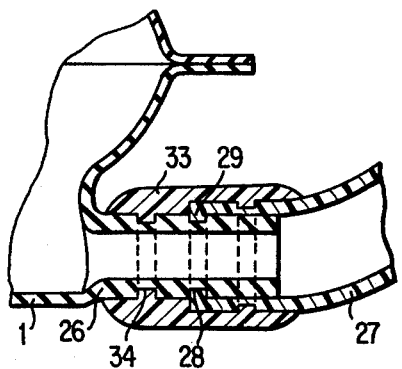

In the case of FIG. 25, there is a combination of notching, coating of the nipple 26 with glue after it has been buffed, and injection at the junction of the nipple 26 and fuel line 27, of a band or rubber 33 which is anchored in grooves 34 made in nipple 26 and the line 27, and which thus assures sealing between these two elements.

The addition of the elastomer can be carried out by means of small electric presses, the jaws of which are adapted to the shape of each connection, and utilizing the technique of injection or transfer of elastomer.

The inner diameter of the nipple 26 is held constant by means of inside pressurization with compressed air or by the introduction of a rod of corresponding diameter into the nipple temporarily.

Local curing of the connection zones is done with electric heating presses, which affects only the regions coated with cement.

As in the preceding step of injecting band 33, the nipple diameter is held constant by the action of air pressure inside the envelope. Naturally, what has been said about the fule-line nipple 26 applies to any other connecting line, which can, moreover, be treated simultaneously in an adequate mold.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of fabricating a flexible fuel tank comprising:
   injecting firstly an elastomer into a mold through an elastomer inlet, the mold having a lower element and an upper stand element, said element defining a first half-shell with a peripheral edge;
   cooling the peripheral edge of the injected elastomer to a temperature below that which would produce complete vulcanization of the injected elastomer;
   vulcanizing in situ the injected elastomer, except for the cooled peripheral edge thereof;
   replacing the mold upper stamp element with a second correspondingly shaped stamp element, the second upper stamp element and the lower element defining a second half-shell also having a peripheral edge, the mold formed by said second stamp element having a larger volume than that of the mold produced by said first stamp element;
   halting the cooling of the peripheral edge;
   injecting secondly an elastomer between the second stamp element and the previously injected elastomer; and,
   vulcanizing in situ the secondly injected elastomer and the peripheral edge of the firstly injected elastomer;
   whereby first and second vulcanized elastomer half-shells are formed and joined at the commonly vulcanized peripheral edges of each half-shell.

2. A method according to claim 1 further comprising:
   injecting air between the half-shells to prevent their contacting surfaces from sticking together, particularly during complete vulcanization of the joining plane.

3. A method according to claim 1 further comprising:
   interposing an intermediate plate between those portions of the surfaces of the half-shells which are to be joined, said plate formed of a material from the group consisting of a metal or a plastic of the polymide type, the intermediate plate having a grainy surface and exhibiting openings for improving its anchoring in the elastomer, the plate coated with a cementing mixture.

4. A method according to claim 1 further comprising:
   interposing an intermediate plate between those portions of the surfaces of the half-shells which are to be joined, said plate formed of a material from the group consisting of a metal or a plastic of the polymide type, the intermediate plate having a non-flat grainy surface and coated with a cementing mixture.

5. A method according to claim 4 wherein the step of interposing comprises:
   positioning the plate within the mold before the injection of the elastomer forming the first half-shell;
   applying the cementing mixture to the side of the plate facing the elastomer inlet;
   cold-cementing the firstly injected elastomer to the cemented plate;
   replacing the firt stamp element with the second stamp element; and
   coating the free side of the intermediate plate with glue prior to the second injection of elastomer for forming the second half-shell.

6. A method according to claim 4 further comprising:
   coating both sides of the intermediate plate with cement prior to interposing the plate; and
   compressing and heating the plate interposed between the two half-shells until polymerization of the cementing mixture.

7. A method according to claim 1 further comprising:
   forming a depression in the under-vulcanized peripheral zone of the first half-shell;
   placing a vulcanized rubber cord in the depression prior to the halting of the cooling of the peripheral edge;
   forming in the periphery of the second half-shell a cavity corresponding to the shape and position of the rubber cord;
   whereby a complementary band is formed in the joined peripheral edges by the complete vulcanization of the joining plane of the tank; and
   forming connecting elements such as for different fuel intake and outlet lines directly in the corresponding molded half-shells.

8. A method according to claim 7 further comprising:
   placing an insert in the mold around the connecting element prior to the first injection of elastomer;
   whereby the connecting elements are internally reinforced.

9. A method according to claim 7 further comprising:
   forming peripheral grooves or channels in the connecting elements, the grooves or channels mating with complementary grooves or channels provided on a surface of the lines to be connected to the connecting elements.

10. A method according to claim 7 further comprising:
    connecting the different lines to the respective connecting elements;
    molding an elastomer locally around the connecting junction between the connecting elements and the connected lines;
    whereby the connecting junction is reinforced by the molded elastomer.

11. A method according to claim 10 further comprising:
    applying an adhesive to the junction prior to molding the junction reinforcing elastomer.

* * * * *